United States Patent Office 3,520,931
Patented July 21, 1970

3,520,931
RESOLUTION OF OPTICALLY ACTIVE
α-ARYLALKYL AMINES
Pierre Marie Joseph Ghislain de Radzitzky d'Ostrowick and Jacques Daniel Victor Hanotier, Brussels, Belgium, assignors to Labofina, Soc. An., Brussels, Belgium, a corporation of Belgium
No Drawing. Filed June 26, 1967, Ser. No. 648,959
Claims priority, application Belgium, July 14, 1966, 30,873
Int. Cl. C07c 85/16
U.S. Cl. 260—570.8
8 Claims

ABSTRACT OF THE DISCLOSURE

Optically-active mixtures of alpha-aryl alkylamine antipodes, in which one of the antipodes predominates, are resolved by forming a Werner complex nickel thiocyanate clathrate of an aromatic compound with all of the racemic amine present in such an unbalanced mixture, leaving the optically-active isomer which was in excess in the original mixture as a separated residue.

---

The present invention relates to a process for resolving a mixture of the optical antipodes of a primary alpha-arylalkylamine in which one of these antipodes predominates. More particularly, it is directed to a process of coordinating into an aromatic hydrocarbon clathrate the racemic amine contained in said mixture as a Werner nickel thiocyanate complex thereof to produce a pure residual optically-active form.

The invention hereof is based on the discovery that when Werner complexes are formed by reacting nickel thiocyanate with a primary alpha-arylalkylamine containing one optical isomer in excess over the racemic mixture thereof in the presence of a clathratable compound X to form a clathrate of the formula

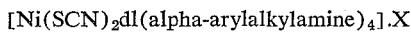

the amine coordinated into the Werner complex comprises equal proportions of both dextro and levo isomeric forms; that is, each form is present in the clathrate in stoichiometrically equal quantity. In this formula X is aromatic hydrocarbon. When the Werner complex is formed in the absence of a clathratable compound, such a selective coordination of racemic amine does not take place. Consequently, it is essential that a clathrate be formed. This discovery, according to the present invention, is the basis of this process of resolving an unbalanced mixture of both antipodes of primary alpha-arylalkylamines by forming a Werner complex clathrate with the amount of racemic amine present in said mixture, whereby that antipode which is in excess remains as residue which can be readily separated from the clathrate and, if needed, further purified from the reaction mixture.

The method has important advantages in comparison with known methods of resolving racemic mixtures of amines since the various available commercial methods have been by reacting the l-form of the amine with the d-form of an acid which alone is readily available commercially; for example, d-tartaric or d-camphoric acid. In such commercial separations of the art, the mother liquor from which the l-amine-d-acid salt is crystallized, contains the d-form of the amine, substantially contaminated with some of the remaining l-form. That d-form cannot be economically purified further. Hence, pure d-amines have been impossible to economically produce. In any case, the prior art procedures have been expensive and laborious while being relatively imperfect to isolate the pure optically-active d-form of such amines. That impure d-amine is readily purified by the present method.

Indeed, the present method, in contrast, will operate on any unbalanced mixture in any proportions of either of such optically-active primary alphaarylalkyl amine isomers, by removing from the mixture, as a Werner complex clathrate, stoichiometrically equal quantities of both d- and l-forms and leaving as residue the pure d- or l-form, whichever was initially present as excess of the initial mixture.

The present procedure, moreover, allows the production of the pure dextro alpha-arylalkylamine which, according to contemporary processes of resolving racemic mixtures, has remained, commercially at least, as an impure residual material, and one which could hardly be isolated. Thus, the present method complements the known ordinary commercial methods, whereby an ordinary racemic mixture can now first be treated with a d-acid to remove much of the l-form of the amine and thereby form an unbalanced mixture available as a crude feedstock for further purification to isolate the d-form which is in excess in the mixture according to the present process. If an unbalanced mixture were available in which the l-form of the amine predominated, then, of course, by the present process the pure l-form of the amine would be produced.

For instance, the impure l-amine first crystallized as its salt of a d-acid may be further purified according to the present process. Hence, by combining the latter with the conventional methods, it is no more necessary to proceed via numerous successive crystallization steps in order to isolate the pure l-form. In contrast with said known methods which require the use of a highly efficient resolving agent in order to reduce as much as possible the number of crystallization steps, any crude resolution of the racemate into two fractions respectively enriched in each isomer is sufficient for obtaining both of them in pure form according to the process of the present invention.

As described in prior United States patents of the present applicants, 3,177,266, 3,177,235, 3,177,234 and 3,076,005, whose disclosures are incorporated and made a part hereof, Werner complexes are formed first by reacting an equal quantity of a water-soluble nickel salt such as $NiCl_2 \cdot 6H_2O$ with two equivalents of a water soluble thiocyanate (or isothiocyanate) such as potassium thiocyanate to form nickel thiocyanate of the formula either $Ni(SCN)_2$ or $Ni(CNS)_2$, and either is intended without discrimination in the formulas as they appear below. Nickel thiocyanate will then react with four equivalents of the primary alpha-arylalkylamine to form a stable Werner complex of the formula

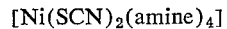

However, when this reaction is performed in the presence of a clathratable compound X, a clathrate of the formula $[Ni(SCN)_2(amine)_4] \cdot X$ is obtained instead of the Werner complex itself. Another method for obtaining the clathrate is first to react nickel thiocyanate with two equivalents of the amine in order to form the two-base complex of the formula $[Ni(SCN)_2(amine)_2]$ which is then reacted in the presence of the clathratable compound with more amine to form the clathrate.

In carrying out the reaction it is sometimes desirable to use inert solvents such as heptane, petroleum ether, and the like, to wash and purify the precipitate for easy separation as described in detail in our prior patents.

As pointed out in these applicants' prior patents, the amine component—the primary alpha-arylalkylamine—may be defined by the general formula

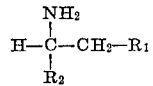

wherein $R_1$ is a member of the group consisting of hydrogen and straight or branched alkyl chains having up to 8 carbon atoms; $R_2$ is a member of the group consisting of phenyl radical, substituted phenyl radicals bearing one to three substituents and bicyclic radicals having 6 carbon atoms in each ring, at least the ring adjacent to the alpha carbon atom having aromatic unsaturation, the second ring being either fused to the first ring as in a naphthalene ring or attached thereto as a single valent radical as in biphenyl. When $R_2$ is a substituted phenyl radical, substituents are members of the group consisting of alkyl, alkoxy and dialkyl amino, in which the alkyl has up to 6 carbon atoms, nitro, fluorine, chlorine, bromine and iodine. When $R_2$ is a di- or trisubstituted phenyl radical, the substituents are preferably attached in the 3, 4 and 5 positions and will preferably be selected from the group consisting of methyl, ethyl, fluorine, chlorine, bromine and iodine. Typical bicyclic $R_2$ radicals are p-cyclohexyl phenyl, p-biphenyl, 2-naphthyl and 2-(5,6,7,8-tetrahydro) naphthyl.

The following are typical primary alpha-arylalkylamine compounds usefully resolved into their optical isomers by the process of the present invention.

alpha-phenylethylamine,
alpha-phenylpropylamine,
alpha-phenylbutylamine,
alpha-phenylamylamine,
alpha-phenylisoamylamine,
alpha-phenylhexylamine,
alpha-phenylisohexylamine,
alpha-phenylheptylamine,
alpha-phenyloctylamine,
alpha-phenylnonylamine,
alpha-phenyldecylamine,
alpha-(o-tolyl)ethylamine,
alpha-(m-tolyl)ethylamine,
alpha-(p-tolyl)ethylamine,
alpha-(p-ethylphenyl)ethylamine,
alpha-(p-cumyl)ethylamine,
alpha-(p-terbutylphenyl)ethylamine,
alpha-(p-hexylphenyl)ethylamine,
alpha-(p-nonylphenyl)ethylamine,
alpha-(p-tolyl)butylamine,
alpha-(p-tolyl)heptylamine,
alpha-(p-fluorophenyl)ethylamine,
alpha-(o-chlorophenyl)ethylamine,
alpha-(m-chlorophenyl)ethylamine,
alpha-(p-chlorophenyl)ethylamine,
alpha-(m-bromophenyl)ethylamine,
alpha-(p-bromophenyl)ethylamine,
alpha-(p-iodophenyl)ethylamine,
alpha-(p-chlorophenyl)propylamine,
alpha-(m-bromophenyl)propylamine,
alpha-(p-bromophenyl)propylamine,
alpha-(-p-chlorophenyl)butylamine,
alpha-(m-bromophenyl)butylamine,
alpha-(p-bromophenyl)butylamine,
alpha-(p-fluorophenyl)amylamine,
alpha-(p-chlorophenyl)amylamine,
alpha-(p-bromophenyl)amylamine,
alpha-(p-fluorophenyl)isoamylamine,
alpha-(p-chlorophenyl)isoamylamine,
alpha-(p-bromophenyl)isoamylamine,
alpha-(p-fluorophenyl)hexylamine,
alpha-(p-chlorophenyl)hexylamine,
alpha-(p-bromophenyl)hexylamine,
alpha-(p-fluorophenyl)heptylamine,
alpha-(m-bromophenyl)heptylamine,
alpha-(p-bromophenyl)heptylamine,
alpha-(p-bromophenyl)nonylamine,
alpha-(p-dimethylaminophenyl)ethylamine,
alpha-(p-methoxyphenyl)ethylamine,
alpha-(p-butoxyphenyl)ethylamine,
alpha-(m-nitrophenyl)ethylamine,
alpha-(3,4-dimethylphenyl)ethylamine,
alpha-(3,5-dimethylphenyl)ethylamine,
alpha-(3,4,5-trimethylphenyl)ethylamine,
alpha-(3,4,5-triethylphenyl)ethylamine,
alpha-(3,4,5-trimethylphenyl)propylamine,
alpha-(3,4-dimethylphenyl)butylamine,
alpha-(3,4-dimethylphenyl)heptylamine,
alpha-(3,4-dichlorophenyl)ethylamine,
alpha-(3,4-dibromophenyl)ethylamine,
alpha-(3-bromo-4-methylphenyl)ethylamine,
alpha-(3,5-dibromo-4-methylphenyl)ethylamine,
alpha-(3,4-dibromophenyl)ethylamine,
alpha-(3-bromo-4-methylphenyl)ethylamine,
alpha-(p-diphenyl)ethylamine,
alpha-(p-cyclohexylphenyl)ethylamine,
alpha-(2-naphthyl)ethylamine, and
alpha-2-(5,6,7,8-tetrahydronaphthyl)ethylamine.

The clathratable compound which has to be present in the medium while the four base complex is being formed is selected from among aromatic hydrocarbons and their polar derivatives such as the following: benzene, toluene, ethylbenzene, propylbenzenes, butylbenzenes, xylenes, diethylbenzenes, cymenes, naphthalene, methylnaphthalenes, tetraline, chlorobenzene, bromobenzene, di- and trichlorobenzenes, nitrobenzene, N,N-dimethylaniline, anisole, and alpha, alpha, alpha-trifluorotoluene, either pure or in admixture.

As stated above, a clathrate results when one mol of nickel thiocyanate is brought into contact with four mols of one of said alpha-arylalkylamine in the presence of a clathratable aromatic compound. The same clathrate also results when one mole of the two-base complex [Ni(NCS)$_2$(amine)$_2$] is brought into contact with two mols of amine in the presence of a clathratable aromatic compound. These two reactions may be visualized in the following way:

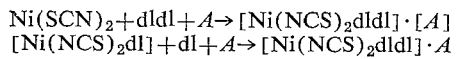

where A denotes a clathratable aromatic compound and [A] the same compound in the clathrated state, and where d and l represent respectively one mol of the dextro and the levo isomer of the amine.

If the same reactions are carried out in the presence of amine enriched in one antipode instead of the racemic mixture, it will always be feasible to compute the amount of nickel thiocyanate of the two-base complex which has to be used in order that the whole amount of racemic amine present initially may be coordinated into a clathrate of the four-base complex and that only the initial excess of one optical antipode may remain unreacted in the liquid phase after clathration has taken place.

These reactions may be visualized in the following way:

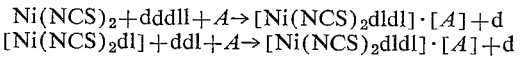

In practice of this invention, the nickel thiocyanate or, as stated, the components which will form the same, or the two-base complex [Ni(SCN)$_2$(dl-amine)$_2$] are contacted, preferably at low temperatures, with the mixture of optical antipodes of the primary alpha-arylalkylamine in which one of the optical isomers predominate, dissolved in the clathratable compound. The nickel thiocyanate or the two-base complex is added in at least stoichiometric quantity to react with the racemic amine present in said mixture. In order to leave in the liquid phase a pure optical isomer, it is essential that this reaction be as complete as possible; that is, the whole of the racemic amine be coordinated into the Werner complex clathrate. For this purpose it is preferred to use an excess of nickel thiocyanate or of two-base complex. For the same reason the clathratable compound will be so selected to form the most stable cathrate and it will preferably be used in excess in order to favor clathrate formation as much as possible. This will leave a solution of the pure residual optically-active isomer of the amine dissolved in the excess of clathratable compound. The pure residual d- or l-amine, whichever was in excess, may then be isolated by extraction such as with a dilute acid to form the amine salt, or by distillation, etc.

Nickel thiocyanate or the two-base complex can be recovered from the clathrate through one of the dissociation processes described in Belgian Pat. 608,984; for instance, the clathrate may be heated in vacuo or in a stream of an inert gas. Under these conditions the clathrated aromatic compound will first be evolved. Then two amine molecules will escape, restoring the two-base complex. Finally, two additional amine molecules, at a still higher temperature, will restore the nickel thiocyanate. A similar treatment can be carried out through elution with an inert solvent such as heptane. The process is quite cyclical, therefore, and it does not consume any reactant. The only condition for its utilization consists in having a mixture at least slightly enriched in one optical antipode of the alpha-arylalkylamine, and this enrichment is usually obtained through classical methods of separation of a racemic mixture.

The following examples illustrate the practice of this invention:

EXAMPLE I

Separation of d-alpha-phenylethylamine through formation of a t-butyl-benzene clathrate t-Butylbenzene (30 ml.) and alpha-phenylethylamine (12.660 millimols) comprising 95.0% d-isomer ($[\alpha]_D = +20°15$) are stirred at 0° C. while adding 3.750 millimols of the two-base complex [Ni(NCS)$_2$(amine)$_2$] obtained from racemic alpha-phenylethylamine. That amount of two-base complex can coordinate 7.5 millimols of racemic amine, and the mixture with t-butylbenzene comprises only 6.33 millimols of said racemic amine, so that an excess of about 18% of the two-base complex is used. The suspension is stirred for 10 minutes at 0° C. The resulting clathrate is then separated through filtration. Analysis shows that this clathrate comprises 1.36 mols of t-butylbenzene per mol of four-base complex, and that the amine bound in the clathrate is racemic. The filtrate containing the uncombined amine is extracted with 40 ml. of n-heptane in order to precipitate any trace of dissolved complex and filtered once more. The amine is extracted from the filtrate by 3 ml. of 20% sulfuric acid, then recovered through addition of 12 ml. of 20% caustic soda and extracted by 5 ml. of n-heptane. The total amine content is determined through acidimetry. The rotatory power of the solution is measured by means of a polarimeter and the specific rotation $[\alpha]_D$ of the undiluted amine determined from a calibration curve. The free amine has a specific rotation of +38°1 and thus comprises 97.3% d-isomer based on the value of +40°3 for $[\alpha]_D$ as stated in the literature for optically pure alpha-phenylethylamine.

EXAMPLE II

Example I is repeated, substituting o-xylene for t-butylbenzene and yielded unreacted amine comprising 94.0% d-isomer. Thus, the choice of the clathratable compound appears not to be critical, provided a stable clathrate is formed.

EXAMPLE III

Examples I and II are repeated, substituting heptane, a non-clathratable compound, for t-butylbenzene, which yielded unreacted amine depleted in d-isomer to 64%. This result demonstrates the clathrate formation is necessary in order that the unreacted amine be enriched in the optical antipode which is initially present in excess.

EXAMPLE IV

Separation of d-alpha-phenylpropylamine through formation of a clathrate with methylnaphthalene 20 ml. of a mixture of 57% alpha and 43% beta-methylnaphthalene, and 10.35 millimols of alpha-phenylpropylamine comprising 67.8% of d-isomer ($[\alpha]_D = +7°2$) are stirred at 0° C. while adding 3.71 millimols of the two-base complex [Ni(NCS)$_2$(amine)$_2$] obtained from racemic alpha-phenylpropylamine. That amount of two-base complex is able to coordinate 7.42 millimols of racemic amine, and the mixture with methylnaphthalenes comprises only 6.67 millimols, so that an excess of two-base complex is used. The system is maintained at 0° C. under agitation for 15 minutes. In order to precipitate most of the dissolved complex, 25 ml. of cold n-heptane are added to the suspension, and the latter is immediately filtered. The clathrate is washed on the filter with 20 ml. of cold n-heptane and dried in air. The amine bound in the clathrate is found to be very nearly racemic, and the clathrated methylnaphthalene is found to comprise 79% beta-isomer. The liquid phase is treated with acid, then with caustic soda as in Example I. The amine from the filtrate has a specific rotation of +17°2. It thus comprises 92.7% d-isomer based on the value +20°2 as cited in the literature for the optically pure amine.

This example illustrates two points. First it illustrates that an amine, very slightly enriched in one optical isomer, can be resolved through this process; and, second, it illustrates that a mixture of clathratable isomers may be used instead of one clathratable compound. In such a case, the four-base complex preferentially clathrates the isomer which forms the most stable clathrate.

EXAMPLE V

This example illustrates the isolation of d-alpha phenylpropylamine by formation of a xylene clathrate from nickel thiocyanate prepared through double exchange between nickel chloride and potassium thiocyanate in aqueous medium. 4 ml. of water containing 3.70 millimols of NiCl$_2$.6H$_2$O and 7.40 millimols of KSCN are stirred at 0° C. with simultaneous addition of 26.24 millimols of alpha-phenylpropylamine comprising 71.8% of d-isomer ($[\alpha]_D = +8°8$) and of 10 ml. of an equimolar mixture of the three xylene isomers. The amount of nickel thiocyanate used here corresponds exactly to the amount needed to form a four-base complex by consuming the whole (14.80 millimols) of racemic amine initially present. Agitation is continued for 10 minutes at 0° C. The resulting suspension is filtered and the precipitate is washed with 15 ml. of cold n-heptane, then with 15 ml. of cold n-pentane, and finally the clathrate is dried in air. The amine bound into the latter is very nearly racemic, and the clathrated xylene is enriched from 33 to 64% in para-isomer, the clathrate of which is the most stable.

The uncombined amine is extracted from the liquid organic phase as in Example I. The specific rotation of the free amine is found to be equal to +16°9, which corresponds to a 91.8% purity with respect to the d-isomer.

EXAMPLE VI

Separation of d-alpha-(m-chlorophenyl) ethylamine through formation of a clathrate with p-xylene This amine, prepared for the first time as its racemic form (Bull. Soc. Chim. Belges 73, 181, 1964) by one of the inventors was reacted with d-tartaric acid and the resulting salt was purified by fractional crystallization. It was thus possible to isolate a levo-amine, apparently pure, the specific rotation of which is −26°35. Amine enriched in the d-isomer was then recovered from the mother liquor, and said isomer could be isolated according to the process of the invention. 20 ml. of p-xylene and 14.84 millimols of alpha (m-chlorophenyl) ethylamine comprising 79.6% d-isomer ($[\alpha]_D + 15°6$) are stirred at room temperature while adding 3.71 millimols of the two-base complex obtained from racemic alpha(m-chlorophenyl) ethylamine. This amount of two-base complex can coordinate 7.42 millimols of racemic amine and the mixture with p-xylene contains 6.05 millimols of racemic amine, so that an excess of two-base complex is used. Agitation is continued at room temperature for 18 hours. Then the suspension is filtered and both the clathrate and the unreacted amine are treated as in Example I. The clathrate comprises 0.8 mol of p-xylene for one mol of the four-base complex. The unreacted amine exhibits a specific rotation of +25°9, which value corresponds to a 99.2% pure d-isomer.

EXAMPLE VII

Separation of d-alpha-phenylisohexylamine through formation of a clathrate with m-xylene This amine, prepared for the first time as its racemic form (Bull. Soc. Chim. Belges 72, 195, 1963) by one of the inventors, was reacted with d-camphoric acid and the resulting salt was purified by fractional crystallization. It was thus possible to isolate a levo-amine, apparently pure, the specific rotation of which is −10°5. Amine enriched in d-isomer was then recovered from the mother liquor, and said isomer could be isolated, according to the process of the invention. 20 ml. of m-xylene and 10.22 millimols of alpha-phenylisohexylamine, comprising 71.2% d-isomer ($[\alpha]_D = +4°43$) are stirred at 0° C. while adding 3.71 millimols of the two-base complex obtained from racemic alpha-phenylisohexylamine. This amount of complex is able to coordinate 7.42 millimols of racemic amine and the mixture with m-xylene comprises only 5.89 millimols of racemic amine, so that an excess of two-base complex is used. Agitation is continued for 10 minutes at 0° C. The suspension is then filtered, and both the clathrate and the unreacted amine are treated as in Example I. The clathrate comprises 1.12 mols of m-xylene per mol of four-base complex. The uncombined amine exhibits a specific rotation of +9°25, which corresponds to a d-isomer content of 94.0%.

The preceding examples demonstrate that the novel process can be applied very widely for resolving any alpha-arylalkylamine, the Werner complex of which forms some clathrate. It is to be emphasized that the enrichments illustrated in these examples are attained in only one step and without using any optically-active compound of the opposite sign as is the case in fractional crystallization processes which, in addition, require a series of successive steps.

Various modifications will occur to those skilled in the art and, accordingly, the several examples are intended as illustrative and not limiting except as defined in the claims appended hereto.

We claim:

1. The process for the separation of an optical isomer of a primary alpha-arylalkylamine from a mixture of the optical isomers thereof in which one of said isomers predominates, said primary alpha alkylamine having the formula

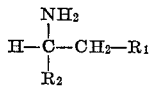

wherein $R_1$ is a member of the group consisting of hydrogen and alkyl radicals having 1 to 8 carbon atoms; $R_2$ is a member of the group consisting of the phenyl radical and the substituted phenyl radicals bearing 1 to 3 substituents of the group consisting of alkyl, alkoxy and dialkyl amino radicals having 1 to 6 carbon atoms, nitro, fluorine, chlorine, bromine and iodine, comprising reacting said mixture in the presence of a clathratable aromatic compound with a member of the group consisting of nickel thiocyanate and the complex $[Ni(SCN)_2(dl\text{-amine})_2]$ of the racemic form of said primary alpha arylalkylamine, said nickel compound being used in quantity at least sufficient to react with the racemic amine present in said mixture of optical isomers to form a clathrate of the complex $[Ni(SCN)_2(dl\text{-amine})_4]$ with said aromatic compound, said aromatic compound being a member of the group consisting of aromatic hydrocarbons having about 6 to 10 carbon atoms and their lower alkyl derivatives and polar derivatives of said aromatic compounds in which the polar substituted radical is a member of the group consisting of lower alkoxyl, halo, halo lower alkyl, dilower alkyl amino and nitro, and separating said clathrate from the residual optical isomer of said mixture.

2. The process as defined in claim 1 in which $R_2$ is phenyl.

3. The process as defined in claim 1 in which $R_2$ is a monosubstituted phenyl radical in which the substituent is a member of the group consisting of alkyl, alkoxy and dialkyl amino radicals having 1 to 6 carbon atoms, nitro, fluorine, chlorine, bromine and iodine.

4. The process as defined in claim 3 in which $R_2$ is a phenyl radical substituted in its 3, 4 and 5 positions by 2 to 3 substituents of said group.

5. The method as defined in claim 4 wherein the phenyl radical is substituted by two to three lower alkyl groups in its 3, 4 and 5 positions.

6. The process as defined in claim 1 wherein the primary alpha-arylalkylamine has the formula:

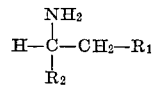

wherein $R_1$ is a member of the group consisting of hydrogen and alkyl radicals having 1 to 8 carbon atoms; $R_2$ is a bicyclic radical having 6 carbon atoms in each ring, at least the ring adjacent to the alpha carbon atom having aromatic unsaturation.

7. The process as defined in claim 6 in which $R_2$ is a bicyclic radical selected from the group consisting of p-cyclohexylphenyl, p-biphenyl, 2-naphthyl and 2-(5,6,7,8-tetrahydro) naphthyl.

8. The process as defined in claim 1 wherein the aromatic hydrocarbon is selected from the group consisting of benzene, naphthalene, Tetraline and their lower alkyl-substituted derivatives.

References Cited

UNITED STATES PATENTS 3,177,234    4/1965    D'Ostrowick et al. ___ 260—439

ROBERT V. HINES, Primary Examiner

U.S. Cl. X.R.

23—77; 260—501.1, 439, 674